United States Patent [19]

Rosendorfer et al.

[11] Patent Number: 6,008,154
[45] Date of Patent: *Dec. 28, 1999

[54] PREPARATION OF SUPPORTED CHROMIUM CATALYSTS

[75] Inventors: Philipp Rosendorfer, Neustadt; Peter Eck, Bad Dürkheim, both of Germany

[73] Assignee: BASF Aktiengesellschaft, Ludwigshafen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/948,068

[22] Filed: Oct. 9, 1997

[30] Foreign Application Priority Data

Oct. 22, 1996 [DE] Germany ............... 196 43 512

[51] Int. Cl.$^6$ ..................... B01J 23/26
[52] U.S. Cl. .............. 502/319; 502/319; 502/150; 502/151; 502/152; 502/171
[58] Field of Search ................ 502/150, 151, 502/152, 171, 305, 319

[56] References Cited

U.S. PATENT DOCUMENTS

| | | | |
|---|---|---|---|
| 3,671,432 | 6/1972 | Peters et al. .......................... | 502/246 |
| 4,233,139 | 11/1980 | Murrell et al. ....................... | 208/112 |
| 4,801,572 | 1/1989 | Hsieh et al. .......................... | 502/242 |
| 5,006,506 | 4/1991 | Hsieh et al. .......................... | 502/204 |
| 5,093,300 | 3/1992 | Vogels et al. ........................ | 502/256 |
| 5,364,915 | 11/1994 | Benham et al. . | |
| 5,543,376 | 8/1996 | Bergmeister ......................... | 502/117 |

FOREIGN PATENT DOCUMENTS

| | | |
|---|---|---|
| 186 174 | 7/1986 | European Pat. Off. . |
| 640 625 | 3/1995 | European Pat. Off. . |
| 1604708 | 12/1981 | United Kingdom . |
| 97/19963 | 6/1997 | WIPO . |

OTHER PUBLICATIONS

M.P. McDaniel, *Advances in Catalysis*, vol. 33, pp. 47–98, 1985, no month available.

*Primary Examiner*—Elizabeth D Wood
*Attorney, Agent, or Firm*—Keil & Weinkauf

[57] ABSTRACT

Supported chromium catalysts are prepared by loading the support material with chromium compounds and calcining at from 400 to 1100° C., and then treating the catalyst with a water-containing inert gas mixture.

7 Claims, No Drawings

PREPARATION OF SUPPORTED CHROMIUM CATALYSTS

The present invention relates to a process for preparing supported chromium catalysts by loading the support material with chromium compounds and calcining at from 400° C. to 1100° C.

The present invention further relates to supported chromium catalysts obtainable by this process, and also the use of these chromium catalysts for the polymerization of α-olefins.

PRIOR ART AND BACKGROUND

Supported chromium compounds have long been known as catalysts for the polymerization of α-olefins (see, for example, M. P. Mc Daniel, Adv. Cat 33, (1985) 47–98). The preparation of such supported chromium catalysts is usually carried out in two stages. In a first step, the support material is first brought into contact with a soluble chromium compound in a suitable solvent. Subsequently, in a second step, the mixture of support and chromium compound is calcined in a stream of air or oxygen at high temperatures, for instance from 400 to 1100° C. (see, for example, U.S. Pat. No. 5,363,915).

It is known that the chromium catalysts can very easily be inactivated by catalyst poisons during the polymerization reaction. In EP-A-0 640 625, for example, states that it is extremely important to thoroughly remove such catalyst poisons such as moisture, oxygen, carbon monoxide, carbon dioxide and acetylene from the polymerization gas and that, for example, 2 ppm of carbon monoxide are sufficient to dramatically impair the polymerization.

The catalyst and polymer properties are influenced significantly by the composition of the support, the support structure (pores volume, mean pore radius, etc.), the calcination temperature and the chromium content. High polymer molecular weights can be achieved, for example, by a lower calcination temperature, although an often undesired broadening of the molecular weight distribution results.

THE INSTANT INVENTION

It is an object of the present invention to find a process for preparing supported chromium catalysts which leads to catalysts which make possible the preparation of polymers having high molecular weights and narrow molecular weight distributions.

We have found that this object is achieved by a process for preparing supported chromium catalysts by loading the support material with chromium compounds and calcining at from 400 to 1100° C., wherein the catalyst is treated with a water-containing inert gas mixture after calcination.

Furthermore, we have found a supported chromium catalyst which is obtainable by the process of the present invention, and also the use of this supported chromium catalyst for the polymerization of α-olefins.

The loading of support materials with soluble chromium compounds is generally known. Particularly suitable support materials are inorganic compounds, in particular porous oxides such as $SiO_2$, $Al_2O_3$, MgO, $ZrO_2$, $TiO_2$, $B_2O_3$, CaO, ZnO or mixtures of these. The support materials preferably have a particle diameter of from 1 to 300 μm, in particular from 30 to 70 μm. Particularly preferred supports are, for example, silica gels and aluminosilicate gels, preferably those of the formula $SiO_2 \cdot a\, Al_2O_3$, where a is a number in the range from 0 to 2, preferably from 0 to 0.5; these are thus aluminosilicates or silicon dioxide. Such products are commercially available, eg. Silica Gel 332 from Grace.

The doping of the catalyst support with the chromium-containing active components is preferably carried out from a solution or, in the case of volatile compounds, from the gas phase. Suitable chromium compounds are chromium(VI) oxide, chromium salts such as chromium(III) nitrate, chromium(III) acetate, complexes such as chromium(III) acetylacetonate or chromium hexacarbonyl, or else organometallic compounds of chromium such as bis(cyclopentadienyl)chromium(II), organic chromic(VI) acid esters or bis(arene)chromium(O).

The loading of the support is generally carried out by bringing the support material in a solvent into contact with a chromium compound, removing the solvent and calcining the catalyst at from 400 to 1100° C. For this purpose, the support material can be suspended in a solvent or in a solution of the chromium compound.

The support system can be loaded not only with the chromium-containing active component but also with further dopants. Possible dopants are, for example, compounds of boron, fluorine, aluminum, silicon, phosphorus or titanium. These dopants are preferably applied to the support together with the chromium compounds, but can also be applied to the support in a separate step before or after loading with chromium.

Suitable solvents for the doping of the support are, for example, water, alcohols, ketones, ethers, esters and hydrocarbons.

The concentration of the doping solution is generally 0.1–200 g of chromium compound/l of solvent, preferably 1–50 g/l.

The weight ratio of the chromium compounds to the support during loading is generally from 0.001:1 to 200:1, preferably from 0.005:1 to 100:1.

After the doping of the support, the dry catalyst precursor is calcined at from 400 to 1100° C., for example in an oxidizing, oxygen-containing atmosphere in a fluidized bed reactor. The calcined product is preferably cooled under an inert gas atmosphere to prevent adsorption of oxygen. This calcination can also be carried out in the presence of fluorine compounds such as ammonium hexafluorosilicate, by means of which the catalyst surface is modified with fluorine atoms.

In a preferred embodiment of the process of the present invention, the calcination is carried out at from 500 to 800° C.

After cooling, the supported catalyst is treated with a water-containing inert gas mixture. Nitrogen is particularly suitable as inert gas, but it is also possible to use, for example, noble gases such as argon or mixtures of such inert gases.

The treatment with the water-containing inert gas mixture is generally carried out at from 20 to 100° C., preferably from 30 to 800° C.

Like the calcination, the treatment with the water-containing inert gas mixture can also be carried out, for example, in a predominantly immobile bed. However, the latter treatment is preferably also carried out in a fluidized bed.

The selected water content of the inert gas depends on both the time and temperature of the treatment. In the case of a low water content, the treatment takes a longer period of time. These parameters are generally chosen such that the water content of the, supported catalyst subsequently reaches the desired value. This can be easily determined in a few preliminary experiments. The inert gas is advantageously loaded with water by passing an inert gas stream through the desired volume of water until this amount of water has been completely carried away by the gas.

Preference is given to chromium catalysts of the present invention which have an adsorbed water content of from 0.05 to 1.0% by weight, based on the total mass of the catalyst. Particular preference is given to an adsorbed water content of from 0.1 to 0.7% by weight, in particular from 0.2 to 0.4% by weight. The water content can here be determined by differential thermogravimetry.

In polymerization reactions of α-olefins, the catalysts of the present invention lead to productivities which are comparable to those given by corresponding untreated catalysts, but the polymers have a higher molecular weight and also a narrower molecular weight distribution. In addition, the water treatment significantly improves the flow behavior of the supported catalyst and thus significantly improves the meterability.

The catalysts of the present invention can be advantageously used for the polymerization of α-olefins.

In these polymerization processes, the pressure is generally from 100 to 10000 kPa, preferably from 1000 to 6000 kPa, and the temperature is generally in the range from 10 to 150° C., preferably from 30 to 125° C.

The supported chromium catalysts are very well suited to the polymerization and oligomerization of α-olefins, preferably $C_2$–$C_{10}$-alk-1-enes such as ethylene, propene, 1-butene, 1-pentene, 1-hexene, 1-heptene, 1-octene, 1-nonene or 1-decene.

In particular, ethylene can be homopolymerized or copolymerized with $C_3$–$C_{10}$-alk-1-enes, for example with propene, 1-butene, 1-hexene, 1-octene or 1-decene or mixtures of these, with the mixing ratio not being critical for the effectiveness of the catalyst.

The polymerization of the alk-1-enes can be carried out by the customary processes for the polymerization of olefins, for example solution processes, suspension processes, stirred gas-phase or gas-phase fluidized bed processes, continuously or batchwise.

The catalysts are particularly well suited for polymerizations by the suspension process and the gas-phase fluidized bed process.

To provide further control of the molecular weights, it can be advantageous to use hydrogen as regulator in the polymerization. Details of this regulation method are known to those skilled in the art.

Furthermore, it has been found to be advantageous to carry out the polymerization in the presence of organometallic compounds. Suitable organometallic compounds are, for example, alkyls of main groups I and II of the Periodic Table of the Elements, and also of aluminum. Particularly preferred metal compounds are n-butyllithium, n-butyl-n-octylmagnesium, n-butyl-n-heptylmagnesium, tri-n-hexylaluminum, triisobutylaluminum, triethylaluminum and timethylaluminum. These organometallic compounds are usually used in such amounts that the molar ratio of their metal atoms to chromium is from 1:0.01 to 1:100, preferably from 1:0.1 to 1:10.

EXAMPLES

Example 1

Preparation of a Supported Catalyst 100 g of silica gel (type SG 332, from Grace, Worms, pore volume: 1.7 ml/g, specific surface area by the BET method: 220 $m^2$/g) were suspended in 250 ml of methanol under a nitrogen atmosphere. A solution of 2.3 g of $Cr(NO_3)_3$ ×9$H_2O$ in 80 ml of methanol were added to the suspension. The suspension was stirred for 10 minutes and then freed of solvent by distillation under reduced pressure. The residue was subsequently calcined at 600° C. in an air-fluidized bed for 10 hours. The bed was cooled by passing dry nitrogen through it. Subsequently, water-containing nitrogen was passed through the fluidized bed at 50° C. until the catalyst had absorbed 0.3% by weight of water.

Preparation of a comparative catalyst not according to the present invention

A comparative catalyst was prepared as described in Example 1, but without final treatment with water-containing nitrogen.

Example 2

Polymerization of Ethylene

A stirable 10 1 pressure autoclave was heated to 95° C. and flushed a number of times with ethylene. While stirring, 500 ml of isobutane were introduced into the reactor and ethylene was injected until a pressure of 40 bar was reached. 500 mg of catalyst and 90 mg of tri-n-hexylaluminum were subsequently metered into the autoclave via a pressure lock. The pressure was kept constant during the polymerization by addition of ethylene. After 90 minutes, the polymerization was stopped by venting the reactor. The results are shown in the following table.

| Catalyst | Productivity [g/g] | $M_w$ [$10^3$] | $M_n$ [$10^3$] | $\underline{M_w}$ $M_n$ | Viscosity [dl/g] | HLMI [g/10 min] |
|---|---|---|---|---|---|---|
| According to Exp 1 | 3500 | 715 | 36 | 20 | 6.7 | 0.2 |
| Comparative catalyst | 3400 | 597 | 23 | 26 | 5.4 | 3.3 |

The example shows that the catalyst according to the present invention leads to a polymer having a higher molecular weight and a narrower molecular weight distribution expressed by the quotient $M_w/M_n$.

We claim:

1. A supported chromium catalyst for the polymerization of α-olefins prepared by the process comprising loading the support material with chromium compounds and calcining at from 400 to 1100° C., wherein the catalyst is treated with a water-containing inert gas mixture after calcination at a temperature of from 20 to 100° C. such that the chromium catalyst has an adsorbed water content of from 0.05 to 1.0% by weight, based on the total mass of the catalyst.

2. A supported chromium catalyst as claimed in claim 1, wherein the support material used is $SiO_2$, $Al_2O_3$, MgO, $ZrO_2$, $TiO_2$, $B_2O_3$, CaO, ZnO or mixtures of these.

3. A supported chromium catalyst as claimed in claim 1, wherein the support material used is silica gel.

4. A supported chromium catalyst as claimed in claim 1, wherein the calcination is carried out at from 500 to 800° C.

5. A supported chromium catalysts as claimed in claim 1, wherein the treatment with the water-containing inert gas mixture is carried out in a gas-phase fluidized bed.

6. A supported chromium catalyst as claimed in claim 1, wherein the treatment with the water-containing inert gas mixture is carried out at from 30 to 80° C.

7. The catalyst of claim 1 wherein the inert gas is nitrogen.

* * * * *